United States Patent
Ashbacher et al.

(10) Patent No.: US 11,539,986 B2
(45) Date of Patent: *Dec. 27, 2022

(54) AUTOMATIC CONTENT RECOGNITION (ACR) FINGERPRINTING AND VIDEO ENCODING

(71) Applicant: Roku, Inc., San Jose, CA (US)

(72) Inventors: Andrew Ashbacher, Santa Cruz, CA (US); Marcus Liassides, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,137

(22) Filed: May 26, 2021

(65) Prior Publication Data
US 2021/0289240 A1 Sep. 16, 2021

Related U.S. Application Data

(63) Continuation of application No. 16/868,651, filed on May 7, 2020, now Pat. No. 11,051,055, which is a
(Continued)

(51) Int. Cl.
| | | |
|---|---|---|
| *H04N 21/234* | (2011.01) | |
| *H04N 21/222* | (2011.01) | |
| *H04N 21/235* | (2011.01) | |
| *H04N 21/84* | (2011.01) | |
| *H04N 21/2225* | (2011.01) | |
| *H04N 21/2343* | (2011.01) | |

(Continued)

(52) U.S. Cl.
CPC ..... *H04N 21/23418* (2013.01); *H04N 21/222* (2013.01); *H04N 21/2225* (2013.01); *H04N 21/2343* (2013.01); *H04N 21/2353* (2013.01); *H04N 21/4586* (2013.01); *H04N 21/84* (2013.01); *H04N 21/23602* (2013.01)

(58) Field of Classification Search
CPC ........... H04N 21/23418; H04N 21/222; H04N 21/2225; H04N 21/2343; H04N 21/2353; H04N 21/4586; H04N 21/84; H04N 21/23602
See application file for complete search history.

(56) References Cited

U.S. PATENT DOCUMENTS 7,308,487 B1 * 12/2007 Dansie ............... H04N 21/4424
705/40
2001/0049788 A1 12/2001 Shur
(Continued)

*Primary Examiner* — Randy A Flynn
(74) *Attorney, Agent, or Firm* — Sterne, Kessler, Goldstein & Fox P.L.L.C.

(57) ABSTRACT

A processing device and method are disclosed to generate automatic content recognition (ACR) fingerprints. A device can include a processing device to execute a capture daemon. The capture daemon may include a capturer to receive media content from a content feed and to generate content frames of the media content. The capture daemon can also include ACR fingerprinter to generate ACR fingerprint information for the content frames. The ACR fingerprinter may communicate the ACR fingerprint information to an ACR server via a first communication channel. The processing device may determine when the ACR fingerprinter fails; cease communicating the ACR fingerprint information to the ACR server; and restart the ACR fingerprinter.

20 Claims, 3 Drawing Sheets

Related U.S. Application Data continuation of application No. 15/457,483, filed on Mar. 13, 2017, now Pat. No. 10,687,092, which is a continuation of application No. 14/839,339, filed on Aug. 28, 2015, now Pat. No. 9,628,830.

(60) Provisional application No. 62/095,539, filed on Dec. 22, 2014.

(51) Int. Cl.
*H04N 21/458* (2011.01)
*H04N 21/236* (2011.01)

(56) References Cited

U.S. PATENT DOCUMENTS

| | | |
|---|---|---|
| 2002/0154691 A1 | 10/2002 | Kost et al. |
| 2004/0163106 A1 | 8/2004 | Schrempp et al. |
| 2005/0141704 A1 | 6/2005 | Van Der Veen |
| 2006/0106806 A1 | 5/2006 | Sperling et al. |
| 2006/0153296 A1 | 7/2006 | Deng |
| 2008/0080711 A1 | 4/2008 | Gagnon et al. |
| 2008/0104652 A1 | 5/2008 | Swenson et al. |
| 2009/0226148 A1 | 9/2009 | Nesvadba et al. |
| 2009/0228933 A1 | 9/2009 | Asbun et al. |
| 2010/0269128 A1 | 10/2010 | Gordon |
| 2010/0287201 A1 | 11/2010 | Damstra et al. |
| 2011/0289114 A1 | 11/2011 | Yu et al. |
| 2012/0047539 A1 | 2/2012 | Hao et al. |
| 2012/0321271 A1 | 12/2012 | Baldwin et al. |
| 2013/0117352 A1 | 5/2013 | Chen et al. |
| 2013/0326082 A1 | 12/2013 | Stokking et al. |
| 2015/0016661 A1 | 1/2015 | Lord |

* cited by examiner

AUTOMATIC CONTENT RECOGNITION (ACR) FINGERPRINTING AND VIDEO ENCODING

CROSS-REFERENCE TO RELATED APPLICATION

This application is a continuation of U.S. patent application Ser. No. 16/868,651, filed May 7, 2020, which is a continuation of U.S. patent application Ser. No. 15/457,483, filed Mar. 13, 2017, which is a continuation of U.S. patent application Ser. No. 14/839,339, filed Aug. 28, 2015, which claims the benefit of U.S. Provisional Application No. 62/095,539, filed Dec. 22, 2014. The entire disclosures of each of these applications are incorporated herein by reference.

BACKGROUND

Media consumption devices, such as smartphones, tablets, and smart televisions (TVs), can access digital content and receive data, such as streaming media, from data networks (such as the Internet). Streaming media refers to a service in which media content can be provided to an end user (upon request) over a telephone line, a cable, the Internet, and so forth. For example, a user can view a movie without having to leave their residence by requesting the movie via a media consumption device and viewing the movie as it is streamed over the Internet. In another example, users can access various types of educational content, such as video lectures, without having to physically attend a school or educational institution.

As the number of media consumption devices continues to increase, media content generation and delivery may similarly increase. With an increase in use of media consuming devices to access streaming media, content or network providers can distribute contextually-relevant material to viewers that are consuming streaming media. For example, local broadcasters can integrate contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
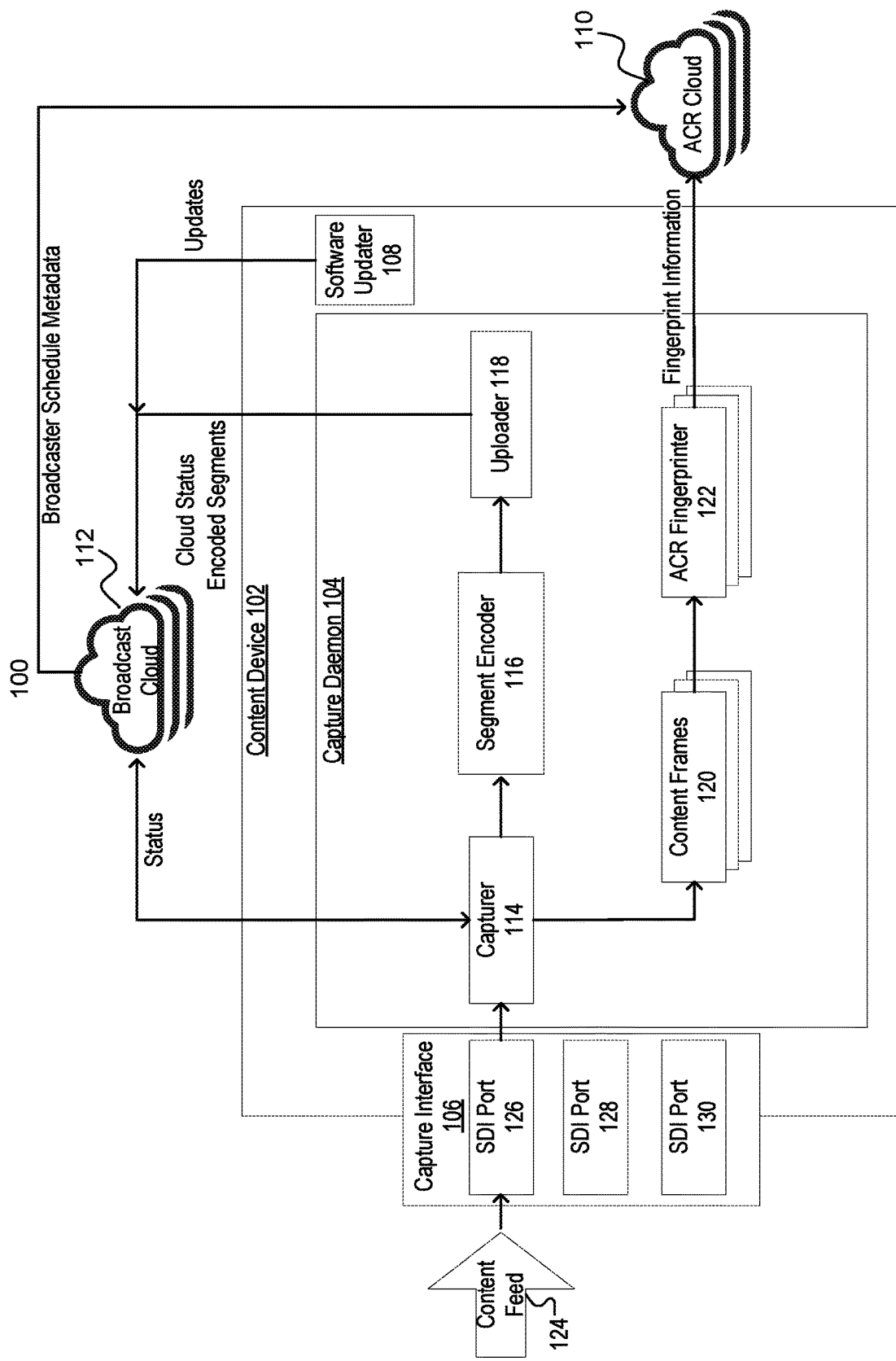
FIG. 1 illustrates a content preparation system to prepare media content according to one embodiment.

To provide viewers with media content, a media content provider may decide to stream the media content to viewers, such as by delivering the media content over the Internet to the viewers. The media content provider can be an individual or an organization such as a local broadcaster, a multi-channel network provider, or another content owner or distributor. The media content may be content (such as video data) originating from one or more live broadcast media feeds. For example, a media content provider may provide a user media content via a linear media channel (e.g. media provided from a live media feed source to a viewer) over the Internet.

The word "content" can be used to refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user or audience. An example of a type of content commonly referred to as a type of media is a "motion picture" referred to as "a film."

Streaming media can be media content that is received by and presented to an end-user from a content provider over a network. Streaming media can be a playback or live media that can be played on media consumption devices. When media is played back on the media consumption devices, the media content may be stored on a server for a period of time and then sent to the media consumption devices over the network upon request, e.g., a video on demand (VOD) service. Live streaming can be the streaming of a live or real-time event, such as a news event or sports event, to the media consumption devices as the event is occurring.

Streaming or transferring media content to media consumption devices over networks can include encoding data (such as video and/or audio data) and/or the transmission of the data over networks. In one example, data can be encoded to provide a secure transfer of data between a provider and a media consumption device. In another example, data can be encoded or converted to adjust for varying display sizes, processing capabilities, network conditions, and/or battery capabilities of the media consumption device. The content generation, processing, encoding, and/or distribution can be performed by a provider (such as at a server) and processing, decoding, and/or content displaying can be performed at the media consumption devices.

Additionally, while advertising can be an engaging venue to advertise products or services, traditional media consumption advertising lacks targeted and personalized advertising. Traditional media consumption advertising also lacks a return path for users to engage with an advertisement and/or enable retargeting of the users once an advertisement has been viewed by the users. To increase an impact and effectiveness of the advertisement, an advertiser may be interested in targeting particular advertisements to particular sets of viewers, such as a viewer of a selected demographic or location. The advertiser may be interested in interacting with the targeted viewer when the targeted viewer sees the targeted advertisement. For example, a content provider may generate a content feed advertisement link to the media content that is relevant to a particular media item. Where consumers of the media items generally tend to select media items that are interesting to them, linking advertisements to media content can enable advertisers to direct their advertisements to consumers who are interested in a particular topic. Media consumption devices with automatic content recognition (ACR) devices or media consumption devices that receive content with contextually-relevant material can provide viewers with targeted and/or personalized advertising as well as an interactive viewing experience.

In one embodiment, ACR devices can use digital watermarking for ACR of broadcast digital content. For example, broadcast content can be preprocessed (e.g. processed prior to broadcast) to insert watermark data within a content signal. That watermark data can be detected by a smart TV or an ACR device to enable identification and synchronization of the media content with the broadcast content.

In another embodiment, an ACR device can identify audio and/or video content using content fingerprinting. Content fingerprinting can be a processing device that identifies, extracts, and compresses fingerprint components of a media content to uniquely identify the media content by its "fingerprint." In one example, fingerprint components can be visual video features such as key frame analysis, colors, and motion changes during a video sequence. The ACR device can identify the video content as the video content may be displayed on a media consumption device by matching a sequence of content fingerprints for the video content being displayed with a database of content fingerprints. An advantage of content fingerprinting can be to process the media content while media content is being broadcasted or streamed (e.g., live processing) or within a selected threshold period of time after the media content is broadcast or streamed (e.g. substantially live processing). As the ACR device processes the media content, the ACR device can adjust for user behavior while the user may be viewing the media content (e.g. live or substantially live adjusting). In one example, the user behavior can be changing or pausing a channel, adjusting a volume of the media consumption device, changing menu settings, and so forth. In another example, the user behavior can be viewing time-shifted content.

For live streaming, multiple devices and/or complex infrastructure can be used to provide a content feed with the contextually-relevant material. For example, traditionally, media content can be encoded by an encoder before providing the media content to a media consumption device. A provider, such as a broadcaster, providing media content to a viewer may desire to distribute contextually-relevant material (including advertisements and interactive content) to viewers. Traditionally, when the provider requests that the media content include contextually-relevant material, the encoder can provide the media content to an ACR fingerprinter. The ACR fingerprinter can insert contextually-relevant material into the encoded media content and the media content can be provided to the viewer with contextually-relevant material.

As multiple devices are used for the preparation and delivery of media content with contextually-relevant material, infrastructure complexity, resource support, and system setup time and complexity can increase. For example, traditionally, ACR service vendors can provide a broadcaster with ACR fingerprinting services and/or a device that performs ACR fingerprinting. Similarly, content encoding and uploading service vendors can provide encoding and uploading services to delivering video streams over the Internet. For example, content encoding and uploading service vendors can provide devices or software for installation on applications that perform content stream preparation and delivery. However, the traditional separate ACR fingerprinting services and the content encoding and uploading services can cause a system of a content provider to experience faults in providing content to streaming content viewers.

Aspects of the present disclosure address the above noted deficiency of using a content device to provide media content using a linear channel. The ACR device can simultaneously fingerprint media content and encode and upload the media content to a server, such as a cloud server, to provide the media content to the media consumption device. The media content can provide a viewer of the media consumption device with encoded media content including contextually-relevant material. In one embodiment, the linear channel can be created using a cloud computing system.

FIG. 1 illustrates a content preparation system 100 to prepare media content according to one embodiment. The content preparation system 100 can include a content device 102, an ACR cloud(s) or server(s) 110, and a broadcast server or cloud(s) 112. The ACR cloud(s) 110 and/or the broadcast cloud(s) 112 can be cloud-based servers. The content device 102 can include a housing with a processing device disposed on a circuit board within the housing. The content device 102 can include a capture daemon 104, a capture interface 106 coupled to the processing device, and/or a software updater 108. The content device 102 can receive media content from a content feed 124 and prepare the media content to include contextually-relevant material that can be delivered to a media consumption device.

The content device 102 can receive the content feed 124 using a capture interface 106. The capture interface 106 can be used to capture and convert media content from the content feed 124. The media content can include audio content, video content, or a combination thereof. In one example, the content feed 124 is a high definition (HD) serial digital interface (SDI) stream. In another example, the content feed 124 is a standard definition (SD) SDI stream. In one example, the capture interface 106 can receive a content feed using a data port. In one example, the data port can be a coaxial cable port, such as a Bayonet Neill-Concelman (BNC) port. In another example, the data port can be a high definition multimedia interface (HDMI) port. In another example, the capture interface 106 is a capture card. In this example, the capture card includes the data port that is an internet protocol (IP) network interface. The IP network interface can be an Ethernet RJ45 port that receives the media content contained in an MPEG-2 Transport Stream. In another example, the content device 102 is processing logic that executes as a process on a remote server and receives media content via a software application programming interface (API). The processing logic may include hardware (e.g., circuitry, dedicated logic, programmable logic, microcode, etc.), software (e.g., instructions executed by a processing device), firmware or a combination thereof. The may be performed by processing logic of the content preparation system 100.

The capture interface 106 can include serial digital interface (SDI) ports, e.g., SDI In/Out ports. The SDI ports can be configured to receive content (e.g., an input port configuration) or send content (e.g., an output port configuration). The capture interface 106 can receive one or more content feeds using the SDI ports 126-130. When the capture interface 106 receives multiple content feeds 124, each content feed 124 can be fingerprinted, encoded, and/or uploaded, as discussed in the proceeding paragraphs. For example, the capture interface 106 can receive 2 content feeds using SDI port 126 and SDI port 128. In this example, the capture daemon 104 can process the content feeds 124 in parallel.

When the capture interface 106 receives content from the content feed 124, the capture interface 106 can send the content feed 124 to a capturer 114. The capturer 114 can be software, firmware, or hardware that can control and/or interact with the capture interface 106. In one example, the capturer 114 instructs the capture interface 106 to use one or more of the SDI ports 126-130 as an input port or output port. In another example, the capturer 114 instructs the capture interface 106 how to obtain incoming media content, such as audio/video data, based on capture criteria. In one example, the capturer 114 communicates with the capturer interface 106 to determine when media content is received from the content feed 124. In this example, when media content is received, the capturer 114 analyzes the media content to determine feed properties. In one example, the feed properties are an audio format and a video format of the media content. In another example, the feed properties are bitrates of the audio and video content of the media content. The capturer 114 can use the capture interface 106 to obtain advanced media content information and perform advanced functions, such as: closed caption information; time codes delivered within the feed; and adjust media content data, such as color space conversion and/or scaling.

When the capturer 114 receives the media content from the capture interface 106, the capturer 114 can provide the media content to both the ACR fingerprinter 122 and to the segment encoder 116. For example, the capturer 114 can provide audio/video data to both the ACR fingerprinter 122 and the segment encoder 116 by splitting the audio/video data for delivery to the ACR fingerprinter 122 and the segment encoder 116. In one example, the capturer 114 can communicate with the broadcast server or cloud(s) 112 to indicate when media content is being received via the capture interface 106 for uploading to the broadcast cloud(s) 112, e.g., a streaming status. In another example, the capturer 114 can receive a status message from the broadcast cloud(s) 112 indicating a status of the broadcast cloud(s) 112 to receive streaming content from the capture daemon 104, e.g., a receiving status. In one embodiment, the capture daemon 104 can communicate with the broadcast cloud(s) 112 using a polling method. In this embodiment, the capture daemon 104 can send a status message to notify the broadcast cloud(s) 112 of a streaming status of the capture daemon 104 (such as content ready for streaming status or no current content for streaming status) and/or retrieve a receiving status from the broadcast cloud(s) 112. In another example, the capturer 114 can provide system metric information to the broadcast cloud(s) 112, such as central processing unit (CPU) utilization, memory utilization, drive utilization, operating temperature, and so forth. In another example, the software updater 108 can be configured to update the content device 102. For example, the software updater 108 can use a polling method to communicate with the broadcast cloud(s) 112 to determine when an update has been scheduled, such as a time of day, and update the content device 102 at the scheduled time.

The segment encoder 116 can receive content from the capturer 114 and encode the content to provide secure content for a transferring of data between the broadcast cloud(s) 112 and the media consumption device. The segment encoder 116 can also encode or convert the data to adjust for varying display sizes, processing capabilities, network conditions, and/or battery capabilities of the media consumption device.

The segment encoder 116 can encode and write content segments to a disk or a memory of the segment encoder 116. When the content segments have been encoded, the segment encoder 116 can then communicate encoded content segments to the uploader 118. After the content is communicated to the uploader 118, the content segments can be deleted from the disk or the memory of the segment encoder 116. When the uploader 118 receives the encoded content segments, the uploader 118 can upload the encoded content segments to the broadcast cloud(s) 112. When the uploader 118 has uploaded the encoded content segments, the uploader 118 can notify the broadcast cloud(s) 112 that the encoded content segments have been encoded and can provide content metadata, such as a time the content was captured by the capture interface 106 and/or a duration of the content.

The broadcast cloud(s) 112 can process the uploaded encoded content segments before delivering the content segments for playback at a media consumption device. The processing by the broadcast cloud(s) 112 can include transcoding the content segments into multiple bit rates to support adaptive bit rate playback and uploading all resultant segments to a content delivery network (CDN).

In parallel with communicating the content to the segment encoder 116, the capturer 114 can generate content frames 120 and can communicate the content frames 120 to an ACR fingerprinter 122. In one example, the content frames 120 can be audio data. In another example, the content frames 120 can be video content. In this example, video content can be raw video frames. When the ACR fingerprinter 122 receives the content frames 120, the ACR fingerprinter 122 can determine how to process and/or transform the content frames 120, such as the raw video frames.

In one example, the content frames 120 can be fingerprinted individually. In another example, the content frames 120 can be fingerprinted in collections or sequences. The ACR fingerprinter 122 can determine when to fingerprint the content frames 120 individually or sequentially based on an ACR algorithm used by the ACR fingerprinter 122. In another example, the ACR fingerprinter 122 can fingerprint the content frames 120 differently for different broadcasters or users. In this example, the ACR fingerprinter 122 can include different ACR fingerprinting algorithms for different ACR vendors. In one embodiment, the different ACR fingerprinting algorithms can be predetermined and stored on a memory of the ACR fingerprinter 122. In another embodiment, the different ACR fingerprinting algorithms can be provided by third party ACR vendors. When different ACR fingerprinting algorithms may be provided by the third party ACR vendors, the ACR fingerprinter 122 can aggregate the different ACR fingerprinting algorithms. In one example, ACR fingerprinting can use raw video with in the YUV 4:2:2 colorspace and at high resolutions. When content feed 124 is received at the capture interface 106, the capturer 114 can convert the content feed 124 to a YUV 4:2:0 colorspace and scale it down in resolution to a threshold resolution level for encoding by the segment encoder 116. In another example, the ACR fingerprinter 122 can determine information for a first media consumption device using a first ACR algorithm and determine ACR fingerprint information for a second media consumption device using a second ACR algorithm.

When the ACR fingerprinter 122 has fingerprinted the content frames 120, the ACR fingerprinter can send fingerprints (including channel information, time codes, and fingerprint information) to the ACR cloud(s) 110. In one example, the different ACR fingerprinting algorithms can be used on the same content frames 120 to provide different fingerprinter information to ACR cloud(s) 110 of different ACR vendors. Different ACR fingerprinting formats can be used by different media consumption devices manufactured by different contract equipment manufacturers (CEMs). An advantage of the ACR fingerprinter 122 including ACR fingerprinting algorithms for different ACR vendors can be to enable content to be fingerprinted and provided to viewers via different media consumption devices regardless of the manufacturer of the media consumption device. An advantage of fingerprinting the same content frames 120 with the different ACR fingerprinting algorithms can be to provide contextually-relevant advertisements and interactive content to viewers with media consumption devices using different ACR fingerprinting. In another example, the content frames 120 can include media content from different content feeds. In this example, the different ACR fingerprinting algorithms can be used on the content frames 120 of the different content feeds to provide different fingerprinting information to ACR cloud(s) 110 of different ACR vendors.

The different fingerprinting information can be uploaded to ACR cloud(s) 110 of the different ACR vendors, respectively. In one example, the ACR cloud(s) 110 can use the ACR fingerprinting information for digital advertisement replacement (DAR). In another example, the ACR fingerprinting information can be used for advertisement or content augmentation and data collection. The ACR cloud(s) 110 can use the fingerprinting information to match the encoded content with contextually-relevant advertisements and interactive content. The matched encoded content and contextually-relevant advertisements and interactive content can then be provided to the media consumption devices for display. In another example, information about the matching events can be communicated to the broadcast cloud(s) 112 for analysis of content matching.

In one example, ACR fingerprinting information can be delivered to the ACR cloud(s) 110 before broadcast schedule metadata can be communicated from the broadcast cloud(s) 112 to the ACR cloud(s) 110. In another example, the broadcast schedule metadata can be uploaded to the ACR cloud(s) 110 when an entire segment has been encoded and received at the broadcast cloud(s) 112. In another example, content can be continuously fingerprinted and resultant fingerprinting information can be continuously communicated or communicated at select rates to ACR vendor clouds. The selected rates can be based on the different ACR vendors. For example, one vendor can deliver ACR fingerprinting information several times per second, whereas another vendor may deliver this information once every 2-5 seconds.

In one example, the content device 102 can encoded, encrypt, and upload content to the broadcast cloud(s) 112. In another example, the content device 102 can receive broadcaster-specific schedule metadata from a broadcaster (data about what shows and ads are in the content feed received at the capture interface 106). The metadata can be communicated by the content device 102 to the broadcast cloud(s) 112. In another example, the broadcast cloud(s) 112 can communicate metadata (such as broadcaster-specific schedule metadata) to the ACR cloud(s) 110 or to different ACR cloud(s) 110 of different vendors so that vendors can us the metadata to match up to the fingerprint information received from the ACR fingerprinter 122.

In one example, the content device 102 can use a first communication channel to communicate with the broadcast server 112 and use a second communication channel to communicate with an ACR cloud 110. For example, the uploader 118 of the content device 102 can communicate or upload encoded content to a broadcast server using the first communication channel. In this example, the ACR fingerprinter 122 can communicate ACR fingerprinting information to the ACR cloud 110 using the second communication channel. The first and second communication channels can be wired or wireless communication channels, such as Wi-Fi communication channels or cellular communication channels.

In one example, where the capturer 114 splits the audio/video data for delivery to the ACR fingerprinter 122 and the segment encoder 116. In another example, the content device 102 encodes and uploads the media content using the segment encoder 116 and uploader 118 and ACR fingerprints the media content using the ACR fingerprinter 122 at the same time or over a threshold period of time. In another example, the content device 102 encodes and uploads the media content using the segment encoder 116 and uploader 118 in parallel with ACR fingerprinting the media content using the ACR fingerprinter 122.

In one example, the capture interface 106 receives the media content from the content feed 124 and delivers the media content to the capturer 114. The capturer 114 can split the media content into multiple threads or processes that can be processed by the segment encoder 116 and the ACR fingerprinter 122 simultaneously or in parallel. In this example, a first thread or process can be encoded by the segment encoder 116 and uploaded by the uploader 118. In one embodiment, a second thread or process can be fingerprinted by the ACR fingerprinter 122 simultaneously or in parallel with the encoding. In another embodiment, the capturer 114 can deliver one or more threads or processes to different external ACR fingerprinters for fingerprinting.

The content device 102 can be a centralized device that can encode and fingerprint media content in parallel to provide media content with contextually-relevant content to the media consumption device. An advantage of encoding and fingerprinting the media content simultaneously or in parallel at the content device 102 is to minimize an amount of infrastructure, overhead, and monitoring used. Another advantage of the content device 102 encoding, uploading, and fingerprinting content can be to provide fault tolerant content streaming with ACR fingerprinting. For example, when the ACR fingerprinter 122 fails, content streaming can continue without interruption and the ACR fingerprinting can be restarted. In one example, the fault tolerant content preparation system 100 can perform ACR fingerprinting as a separate process from content encoding and uploading to avoid faults in providing streaming content for viewing.

In one example, the ACR fingerprinter 122 can perform ACR fingerprinting upstream of broadcast distribution in the content preparation system 100. In another example, the ACR fingerprinting can occur in the broadcast chain where broadcast feeds can be delivered for encoding and uploading. An advantage of performing ACR fingerprinting where the broadcast feeds can be delivered for encoding and uploading can be to enable the content preparation system 100 to combine the ACR fingerprinting, encoding, and uploading into a single device. Another advantage of performing ACR fingerprinting where the broadcast feeds can be delivered for encoding and uploading can be to utilize a single broadcast feed to perform ACR fingerprinting, encoding, and uploading. When a single broadcast feed is used, a number of devices and/or applications to be purchased, installed, monitored, and maintained for ACR fingerprinting, encoding, and uploading of content by an enterprise can be reduced. For example, capital expenses (CAPEX) and/or operational expenses (OPEX) of the enterprise can be reduced, such as a reduced system infrastructure (rack space, power, and Ethernet connectivity). Additionally, when a single broadcast feed is used, a number of broadcast feeds generated from a broadcaster's distribution amplifier can be reduced.

Figure 2:
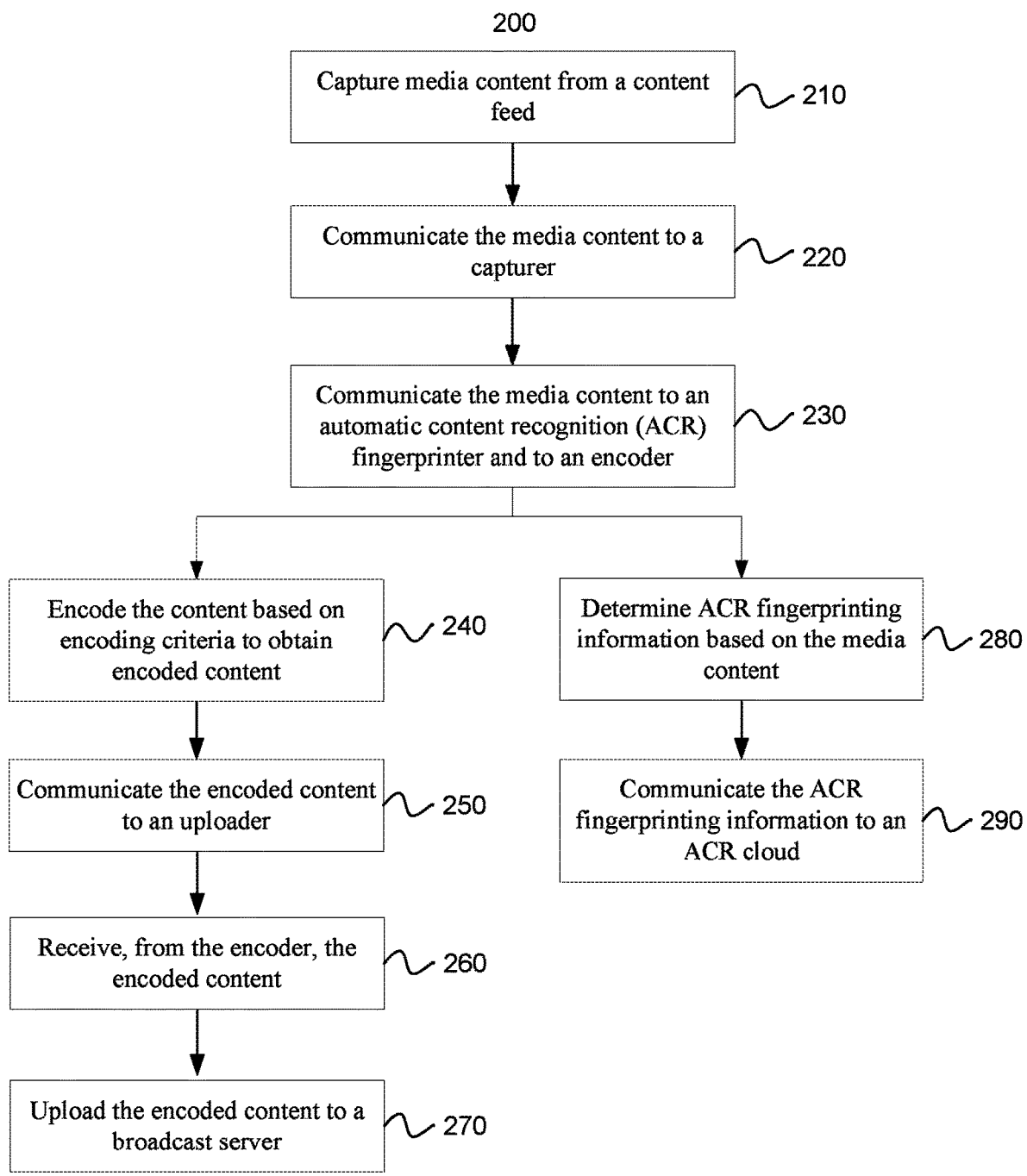
FIG. 2 illustrates a flowchart of a client device for encoding and automatic content recognition (ACR) fingerprinting according to one embodiment.

FIG. 2 illustrates a method 200 of the content device 102 (illustrated in FIG. 1) for encoding and automatic content recognition (ACR) fingerprinting according to one embodiment. The method 200 may be at least partially performed by processing logic of the content device 102 that may include hardware (e.g., circuitry, dedicated logic, programmable logic, microcode, etc.), software (e.g., instructions executed by a processing device), firmware or a combination thereof.

The processing logic of the content device 102 can include the capture interface 106, the capturer 114, the segment encoder 116, the uploader 118, and one or more ACR fingerprinters 122.

Referring to FIG. 2, the method 200 begins with capturing media content, by capture interface 106, from the content feed 124 (210). The method can also include communicating, by the capture interface 106, the media content to the capturer 114 (220). The method can include, communicating, by the capturer 114, the media content to the ACR fingerprinter 122 and to the segment encoder 116 (230).

The method can also include encoding, by the segment encoder 116, the content based on encoding criteria to obtain encoded content (240). In one example, the encoding criteria can include: a security encryption format; display size adjustment information; network processing capabilities information; network communication condition information; or battery capabilities of a media consumption device. In one example, the battery capabilities of media consumption device may be predetermined and stored at the content device. In this example, the content device can encode the media content based on the battery capabilities to reduce battery drain using lower resolution media content for battery capacity limited media consumption devices or increase the resolution of the media content when the battery capacity of the media consumption device is relatively large. The method can also include sending, by the segment encoder 116, the encoded content to the uploader 118 (250). The method can also include receiving, from the segment encoder 116, the encoded content at the uploader 118 (260). The method can also include uploading, by the uploader 118, the encoded content to the broadcast server or cloud 112 (270).

The method can also include determining, by the ACR fingerprinter 122, the ACR fingerprinting information based on the media content (280). The method can also include communicating, by the ACR fingerprinter 122, the ACR fingerprinting information to the ACR cloud 110 (290). In one example, the encoding the media content (240-270) and ACR fingerprinting of the media content (280-290) are done at the same time or in parallel. In another example, the encoding the media content (240-270) and ACR fingerprinting of the media content (280-290) are done independent of each other.

Figure 3:
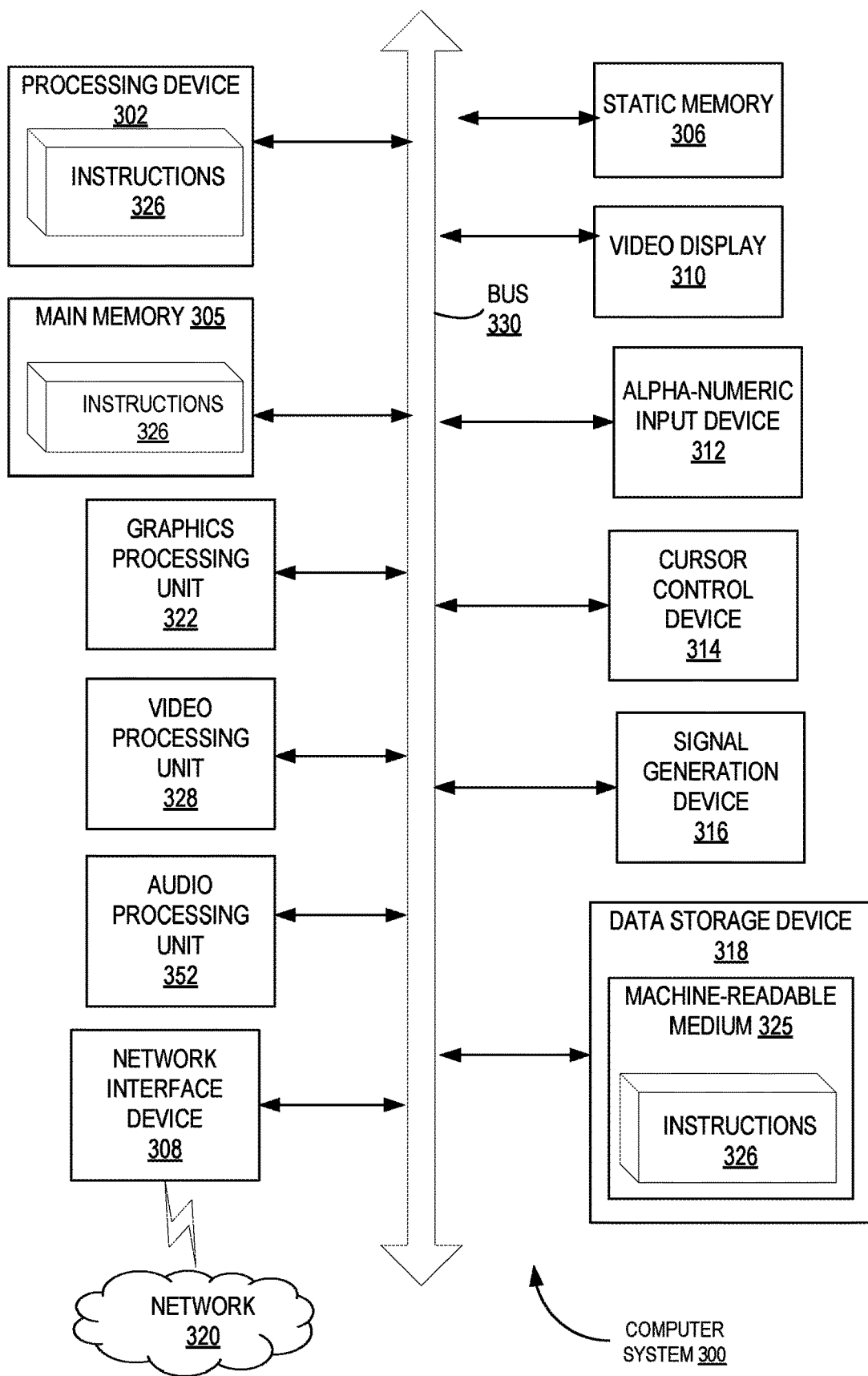
FIG. 3 schematically illustrates a block diagram of a system according to one embodiment.

FIG. 3 schematically illustrates a block diagram of a computer system 300 according to one embodiment. In one embodiment, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 300 may correspond to the content preparation system 100 of FIG. 1. The computer system 300 may correspond to the content device 102 of FIG. 1. The computer system 300 may correspond to at least a portion of the content device 102, such as the capture daemon 104 or the capture interface 106.

The computer system 300 includes a processing device 302, a main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. In one embodiment, processing device 302 may include one or more processing cores. The processing device 302 is configured to execute the instructions 326 of a mirroring logic for performing the operations discussed herein.

The computer system 300 may further include a network interface device 308 communicably coupled to a network 320. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), a signal generation device 316 (e.g., a speaker), or other peripheral devices. Furthermore, computer system 300 may include a graphics processing unit 322, a video processing unit 328, and an audio processing unit 332. In another embodiment, the computer system 300 may include a chipset (not illustrated), which refers to a group of integrated circuits, or chips, that are designed to work with the processing device 302 and controls communications between the processing device 302 and external devices. For example, the chipset may be a set of chips on a motherboard that links the processing device 302 to very high-speed devices, such as main memory 304 and graphic controllers, as well as linking the processing device 302 to lower-speed peripheral buses of peripherals, such as USB, PCI or ISA buses.

The data storage device 318 may include a computer-readable storage medium 324 on which is stored instructions 326 embodying any one or more of the methodologies of functions described herein. The instructions 326 may also reside, completely or at least partially, within the main memory 304 and/or within the processing device 302 during execution thereof by the computer system 300; the main memory 304 and the processing device 302 also constituting computer-readable storage media.

The computer-readable storage medium 324 may also be used to store instructions 326 utilizing logic and/or a software library containing methods that call the above applications. While the computer-readable storage medium 324 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A client computing device comprising:
   at least one processing device configured to execute a daemon, the daemon comprising an automatic content recognition (ACR) fingerprinter configured to:
   (i) receive one or more content frames in a first resolution generated from media content of a content feed,
   (ii) generate ACR fingerprint information for the received content frames in the first resolution,
   (iii) communicate the ACR fingerprint information from the client computing device to an ACR server via a first communication channel, while determining whether the ACR fingerprinter fails, and
   (iv) in response to determining that the ACR fingerprinter has failed, and while the received content frames in a second resolution are being encoded by the at least one processing device:
   (a) cease the communication of the ACR finger print information from the ACR fingerprinter to the ACR server, and
   (b) restart the ACR fingerprinter, wherein the first resolution is different from the second resolution; and
   a memory on which the daemon is stored.

2. The client computing device of claim 1, further comprising a capture interface, wherein the daemon further comprises a capturer configured to receive the media content from the content feed, generate the one or more content frames in the first resolution from the media content, and send the generated content frames to the ACR fingerprinter.

3. The client computing device of claim 2, wherein the capture interface is configured to convert the media content to a format that is compatible with the capturer.

4. The client computing device of claim 2, wherein the capture interface includes a digital interface port to receive the media content.

5. The client computing device of claim 4, wherein the capturer is configured to:
   receive the media content from the content feed via the digital interface port; and
   communicate capture criterion to the capture interface, wherein the capture criterion is a criterion to obtain the media content from the content feed.

6. The client computing device of claim 1, wherein the at least one processing device is further configured to execute a software updater to update the software executed by the at least one processing device.

7. The client computing device of claim 6, wherein the software updater is configured to:
   communicate with a broadcast server to determine a time when an update is scheduled; and
   update the software at the time.

8. The client computing device of claim 1, wherein the daemon further comprises an encoder to encode the media content in parallel with the ACR fingerprinter generating the ACR fingerprint information.

9. The client computing device of claim 1, wherein the ACR fingerprinter is further configured to:
   determine the ACR fingerprint information for a first media consumption device using a first ACR algorithm; and
   determine the ACR fingerprint information for a second media consumption device using a second ACR algorithm.

10. A client computing device comprising:
    at least one processing device configured to execute a daemon, the daemon comprising:
    an encoder configured to (i) receive one or more content frames in a first resolution generated from media content received by the at least one processing device from a content feed and (ii) use encoding criteria as a basis for encoding the received content frames in a second resolution, and
    an automatic content recognition (ACR) fingerprinter configured to: (i) receive one or more content frames in the first resolution generated from media content of a content feed, (ii) generate ACR fingerprint information for the received content frames in the first resolution, (iii) communicate the ACR fingerprint information from the client computing device to an ACR server via a first communication channel, while determining whether the ACR fingerprinter fails, and (iv) in response to determining that the ACR fingerprinter has failed, and while the received content frames are being encoded by the at least one processing device in the second resolution: (a) cease the communication of the ACR fingerprint information from the ACR fingerprinter to the ACR server, and (b) restart the ACR fingerprinter, wherein the first resolution is different from the second resolution, and
    a memory on which the daemon is stored.

11. The client computing device of claim 10, wherein the daemon further comprises a capturer configured to receive the media content from the content feed, generate the one or more content frames in the first resolution from the media content, and send the generated content frames to the ACR fingerprinter and the encoder, and wherein the at least one processing device further comprises a capture interface configured to convert the media content to a format that is compatible with the capturer.

12. The client computing device of claim 11, wherein:
the capturer is configured to communicate a capture criterion to the capture interface;
and the capture criterion is criterion to obtain media content from the content feed.

13. The client computing device of claim 10, wherein the at least one processing device is further configured to execute the encoder to adjust for a display size of a media consumption device, a processing capability of the media consumption device, a network condition of the media consumption device, or a battery capability of the media consumption device.

14. A method comprising:
generating, by at least one processing device of a client computing device and using an automatic content recognition (ACR) fingerprinter, ACR fingerprinting information based on content frames in a first resolution generated from media content of a content feed;
communicating, by the at least one processing device, the ACR fingerprint information from the client computing device to an ACR cloud system, while determining whether the ACR fingerprinter fails; and
in response to determining that the ACR fingerprinter has failed and while the content frames in a second resolution generated from the media content are being encoded by the at least one processing device: (i) ceasing, by the at least one processing device, the communication of the ACR fingerprint information to the ACR cloud system, and (ii) restarting, by the at least one processing device, the ACR fingerprinter, wherein the first resolution is different from the second resolution.

15. The method of claim 14, further comprising:
receiving the media content; and
generating from the received media content, the first set of content frames and the second set of content frames.

16. The method of claim 14, further comprising:
receiving a status message from a broadcast server indicating a status of the broadcast server to receive streaming content.

17. The method of claim 16, further comprising:
encoding the content frames in the second resolution based on encoding criteria to obtain encoded media content; and
communicating the encoded media content from the at least one processing device to the broadcast server while the ACR fingerprinter restarts.

18. The method of claim 14, further comprising encoding the content frames in the second resolution in parallel with generating the ACR fingerprint information.

19. The method of claim 14, further comprising:
determining the ACR fingerprint information for a first media consumption device using a first ACR algorithm; and
determining the ACR fingerprint information for a second media consumption device using a second ACR algorithm.

20. The method of claim 14, further comprising:
executing a software updater to update a software executed by the at least one processing device.

* * * * *